United States Patent
Harada et al.

(10) Patent No.: US 7,340,420 B2
(45) Date of Patent: Mar. 4, 2008

(54) METHOD AND SYSTEM FOR PROVIDING INFORMATION ON INDUSTRIAL WASTES, SERVER AND TERMINAL FOR PROVIDING THE INFORMATION, RECORDING MEDIUM FOR RECORDING COMPUTER-READABLE PROGRAM, AND PROGRAM ALLOWING COMPUTER TO EXECUTE PROCESS

(75) Inventors: Takao Harada, Kobe (JP); Hiroshi Sugitatsu, Kobe (JP); Hidetoshi Tanaka, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 748 days.

(21) Appl. No.: 10/253,873

(22) Filed: Sep. 25, 2002

(65) Prior Publication Data

US 2003/0061127 A1    Mar. 27, 2003

(30) Foreign Application Priority Data

Sep. 26, 2001    (JP)    ............................. 2001-294004

(51) Int. Cl.
*G06Q 10/00*    (2006.01)
(52) U.S. Cl. ................. 705/28; 705/1; 705/7
(58) Field of Classification Search .................. 705/28
See application file for complete search history.

(56) References Cited

U.S. PATENT DOCUMENTS

| | | | |
|---|---|---|---|
| 5,532,928 A * | 7/1996 | Stanczyk et al. ............... 705/7 |
| 5,989,019 A | 11/1999 | Nishimura et al. ......... 432/138 |
| 6,063,156 A | 5/2000 | Negami et al. ............... 75/504 |
| 6,129,777 A | 10/2000 | Fuji et al. ...................... 75/484 |
| 6,149,709 A | 11/2000 | Uragami et al. ............... 75/504 |
| 6,152,983 A | 11/2000 | Kamijo et al. ................ 75/484 |
| 6,241,803 B1 | 6/2001 | Fuji ............................. 75/425 |
| 6,251,161 B1 | 6/2001 | Tateishi et al. ............... 75/484 |
| 6,254,665 B1 | 7/2001 | Matsushita et al. ........... 75/484 |
| 6,258,149 B1 | 7/2001 | Sugiyama et al. ............ 75/484 |
| 6,296,479 B1 | 10/2001 | Nishimura et al. ......... 432/138 |
| 6,319,302 B1 | 11/2001 | Harada ........................ 75/484 |
| 6,334,883 B1 | 1/2002 | Takenaka et al. .............. 75/319 |
| 6,368,379 B1 | 4/2002 | Tateishi et al. ............... 75/484 |
| 2002/0072923 A1 * | 6/2002 | Guidry ........................... 705/1 |
| 2002/0147502 A1 * | 10/2002 | Price et al. ..................... 700/1 |
| 2004/0054549 A1 * | 3/2004 | Chittenden et al. ............ 705/1 |
| 2006/0041486 A1 * | 2/2006 | Harris .......................... 705/26 |

* cited by examiner

*Primary Examiner*—Ryan M Zeender
*Assistant Examiner*—Asfand M Sheikh
(74) *Attorney, Agent, or Firm*—Oblon, Spivak, McClelland, Maier & Neustadt, P.C.

(57) ABSTRACT

A system provides assistance in the delivery of industrial wastes from industrial waste-generating sites to one or more industrial waste treatment sites based on exchanged information on industrial wastes containing metal oxide. The system includes a server, terminals at the industrial waste-generating sites, and terminals at the industrial waste treatment sites. Each terminal at the industrial waste-generating site transmits the information on industrial wastes to the server. The server stores the transmitted formation into an information storage unit. The server receives the search conditions from one of the industrial waste treatment sites who require industrial wastes, search the information storage unit, and transmits the search result to the terminal at the corresponding industrial waste treatment site. The terminal at the industrial waste treatment site displays the search result.

9 Claims, 14 Drawing Sheets

FIG. 5

| IRON MAKING DUST SITE: A | | | |
|---|---|---|---|
| DUST NAME: | A-1 | A-2 | A-3 |
| TYPE: | BLAST FURNACE SLUDGE | ELECTRIC FURNACE DUST | MILL SCALE |
| QUANTITY: | 10,000 t | 2,000 t | 5,000 t |
| DELIVERABLE DATE: | _M_D | _M_D | _M_D |
| WATER CONTENT: | 30 % | <1 % | 2 % |
| COMPOSITION | | | |
| IRON: | 30 % | 20 % | 70 % |
| CARBON: | 30 % | 1 % | 0 % |
| ZINC: | 1 % | 20 % | 0 % |
| α COMPONENT | UNCLEAR | UNCLEAR | NON |

FIG. 6

PERSON WHO DISPOSES DUST: X

PROPOSED DUST ID NO. [ X-a ]

PRIORITY

| | | | |
|---|---|---|---|
| 1 | QUALITY | IRON < 50 | % |
| 2 | DISPOSABLE QUANTITY | 10,000 | t |
| 3 | COLLECTED DATE | _M_D | |
| 4 | WATER CONTENT | < 10 | % |

OTHER REQUIRED ITEMS

1. CARBON CONTENT
2. TYPE OF DUST
3. α COMPONENT

NECESSARY WASTE ID NO. [ X-b ]

| | | |
|---|---|---|
| TYPE | WASTE OIL | |
| REQUIRED QUANTITY | 1,000 | kl |
| DESIRED CONDITION | CALORIFIC VALUE | kJ/l |
| ARRIVAL DATE | _M_D | |

NECESSARY WASTE ID NO. [ X-c ]

| | | |
|---|---|---|
| TYPE | SHREDDER DUST | |
| REQUIRED QUANTITY | 1,000 | t |
| DESIRED CONDITION | DUST SIZE | |
| ARRIVAL DATE | _M_D | |

FIG. 7
| SEARCH RESULTS | REQUIRED ITEMS: 3 FOUND |
CLICK NUMBER FOR DISPLAYING DETAIL INFORMATION AND OFFER OF PURCHASE.
(SORTED BY PRIORITY)
| CHECK | ① IRON CONTENT | ② WEIGHT (T) | ③ LOCATON |
|---|---|---|---|
| ☐ | 30 | 10,000 | A COMPANY (K CITY) |
| ☐ | 45 | 5,000 | B COMPANY (A CITY) |
| ☐ | 30 | 2,000 | C COMPANY (I CITY) |
 TO SEARCH    TO HOME

METHOD AND SYSTEM FOR PROVIDING INFORMATION ON INDUSTRIAL WASTES, SERVER AND TERMINAL FOR PROVIDING THE INFORMATION, RECORDING MEDIUM FOR RECORDING COMPUTER-READABLE PROGRAM, AND PROGRAM ALLOWING COMPUTER TO EXECUTE PROCESS

BACKGROUND OF THE INVENTION

1. Field of the Invention

The present invention relates to an information processing technology that provides information on industrial wastes. The information provides assistance in the delivery of industrial wastes from industrial waste-generating sites to industrial waste treatment sites based on exchanged information about industrial wastes including metal oxide wastes with a server that connects with terminals at the industrial waste-generating sites and terminals at the industrial waste treatment sites through a communication network.

2. Description of the Related Art

A large amount of iron-containing dust that is generated in iron and steel plants and automobile junkyards is heat treated in treatment plants to remove volatile metals such as zinc and lead and to recover high-purity metallic iron from the wastes. Known heat treatment processes for blast furnace dust and electric furnace dust and mill scales from the steel plants are rotary hearth furnace processes, kiln processes, shaft kiln processes, and reductive fusion processes.

Large-scale blast furnace integrated steelworks, which generate large quantities of dust, allow efficient operations of their own dust treatment facilities, while medium- and small-scale electric furnace plants, which generate small quantities of dust, may require a collective treatment, that is, dust generated in different iron and steel plants are collectively disposed in a dust treatment facility for achieving economies of scale.

The blast furnace integrated steelworks could enjoy economies of scale if dusts from other places are disposed in their dust treatment facilities. Such treatment systems are preferable for economical reasons, but require large spaces for storing large quantities of dust from their own plants and from other places. However, storage areas for dust being industrial wastes are limited in the plants. Thus, it is difficult to receive a variety of dust in large quantities from other places.

Dust and industrial wastes are composed of various types. For example, converter furnace dust, electric furnace dust, and mill scales contain large amounts of metal oxides and small amounts of carbonaceous compounds functioning as reducing agents. On the other hand, blast furnace dust and carbonaceous industrial wastes contain large amounts of carbonaceous reducing agents.

Recently, Internet electronic commerce networks have been utilized. In electronic commerce, users view electronic trade catalogs such as book catalogs that are stored in servers and order articles of commerce through the networks.

Delivery of industrial wastes by conventional electronic commerce methods are difficult for the following reasons: When an industrial waste disposer orders a desired waste by viewing electronic information on industrial wastes, the waste disposer cannot select the desired waste from a variety of wastes generated in many different places, as a matter of fact. For example, it is difficult to select the most proper waste from very similar wastes. Furthermore, the required quantity for the waste disposer is generally different from the quantity of waste generated in a plant. No method for solving such a mismatching is not proposed.

SUMMARY OF THE INVENTION

An object of the present invention is to provide a method for providing information on industrial wastes. The information provides assistance in the selection and delivery of the industrial wastes from an industrial waste-generating site to an industrial waste treatment site based on exchanged information about industrial wastes including metal oxide wastes with a server that connects with terminals at the industrial waste-generating site and a terminal at the industrial waste treatment site through a communication network.

Another object of the present invention is to provide a system, a server, and a terminal for providing information on industrial wastes, a recording medium for recording a computer-readable program, and a program that allows a computer to execute a process for the method.

According to a first aspect of the present invention, in a method for providing assistance in the delivery of industrial wastes from a plurality of industrial waste-generating sites to at least one industrial waste treatment site based on exchanged information about industrial wastes containing metal oxide through a communication network that connects a server with terminals of the plurality of industrial waste-generating sites and a terminal at the industrial waste treatment site, the method includes a first step of inputting search conditions including at least the chemical components, weight, and delivery time of an industrial waste that are required for the industrial waste treatment site, from the terminal at the industrial waste treatment site, and transmitting the search conditions to the server; a second step of searching an information storage unit for the information on industrial wastes that satisfies the input conditions in the first step in the server; and a third step of transmitting the search result to the terminal at the industrial waste treatment site.

In the first step, the search conditions including at least the chemical components, weight, and delivery time of an industrial waste is transmitted from the terminal at the industrial waste treatment site to the server. In the second step, the server searches an information storage unit for the information on industrial wastes that satisfies the input conditions in the first step. In the third step, the search result is transmitted to the terminal at the industrial waste treatment site. The industrial waste treatment site can readily select a required industrial waste or wastes from a variety of industrial wastes at different locations. Furthermore, the industrial waste treatment site can select different types of industrial waste by an optimized combination of metal-containing wastes and carbonaceous wastes (functioning as reducing agents). Thus, this system facilitates effective recycle of resources.

Preferably, the method further includes a fourth step of selecting at least one industrial waste from the search result at the terminal at the industrial waste treatment site in response to the third step and transmitting the selected information from the terminal at the industrial waste treatment site to the server; and a fifth step of transmitting order information from the server to a terminal of an industrial waste-generating site having the industrial waste included in the selected information.

The industrial waste treatment site can select and order suitable one among many candidate industrial wastes. Since the order is automatically transmitted to the corresponding industrial waste-generating site, a series of processes from searching to ordering is rapidly performed.

Preferably, the information on industrial waste includes a deliverable date of the industrial waste.

The industrial waste treatment site can obtain a required industrial waste at a time when the industrial waste is needed. Thus, the industrial waste treatment site does not require a large stockyard.

Preferably, both the information on industrial waste and the conditions include the address of the industrial waste-generating site.

The address of the industrial waste-generating site facilitates delivery of the industrial waste from the industrial waste-generating site to the industrial waste treatment site.

Preferably, the search conditions in the first step include the order of priority and the second step performs the search in accordance with the order of priority.

A broad range of industrial wastes is extracted in this priority search, the industrial waste treatment site can select one or more suitable industrial wastes from the search results.

A second aspect of the present invention relates to recording medium for recording a computer-readable program that allows a computer in the server to execute the above method. A third aspect of the present invention relates to a program that allows a computer in the server to execute the above method.

According to the fourth aspect of the present invention, in a system for providing assistance in the delivery of industrial wastes from a plurality of industrial waste-generating sites to at least one industrial waste treatment site based on exchanged information about industrial wastes containing metal oxide, the system comprises a server; terminals at the industrial waste-generating sites connecting to the server through a communication network; and at least one terminal at the industrial waste treatment site connecting to the server through the communication network. The terminal of each of the industrial waste-generating sites comprises a transmitting unit for transmitting information on industrial waste including at least the chemical components and weight to the server. The server comprises an information storage unit for storing the information on industrial waste associated with the corresponding terminal at the industrial waste-generating site; a receiving unit for receiving search conditions from the terminal of the industrial waste treatment site, the search conditions including at least the chemical component, weight, and delivery time of an industrial waste required for the industrial waste treatment site; a search unit for searching the information storage unit for information on industrial waste that satisfies the input search conditions; and a transmission unit for transmitting the search result from the server to the terminal at the industrial waste treatment site. The terminal at the industrial waste treatment site comprises an input unit for inputting search conditions including the chemical components, weight, and the delivery time of an industrial waste required for the industrial waste treatment site; a transmission unit for transmitting the input search conditions to the server; and a receiving unit for receiving the search result from the server and displaying the result on a monitor.

According to a fifth aspect of the present invention, in a server for providing assistance in the delivery of industrial wastes from a plurality of industrial waste-generating sites to at least one industrial waste treatment site based on exchanged information about industrial wastes containing metal oxide, the server connecting with terminals of the plurality of industrial waste-generating sites and the industrial waste treatment site through a communication network, the server comprises a storage unit for storing information on industrial wastes including the chemical components and weights associated with the respective terminals at the industrial waste-generating sites, the information being input from the terminals; a receiving unit for receiving search conditions including the chemical components, weight, and the delivery time from the terminal at the industrial waste treatment site; a search unit for searching the information storage unit for the information on an industrial waste that satisfies the search conditions; and a transmission unit for transmitting the search result to the terminal at the industrial waste treatment site.

According to a sixth aspect of the present invention, in a terminal at an industrial waste treatment site connectable to a plurality of industrial waste-generating sites through a server on a communication network for providing assistance in the delivery of industrial wastes from one of the industrial waste-generating sites to the industrial waste treatment site based on exchanged information about industrial wastes containing metal oxide, the terminal comprises an input unit for inputting search conditions including at least the chemical components, weight, and delivery time of an industrial waste required for the industrial waste treatment site; a transmittance unit for transmitting the input search conditions to the server; and a receiving unit for receiving the search result from the server and displaying the result on a monitor. The date and time in the delivery time may not be clear. For example, the delivery time may be "beginning of May", "middle of July", or "end of September".

BRIEF DESCRIPTION OF THE DRAWINGS

FIG. 5 is a format that is displayed on a monitor at an iron-making dust generating site, for inputting information on industrial wastes;

FIG. 6 is a format that is displayed on a monitor at an iron-making dust disposer, for inputting search conditions;

FIG. 7 is a format for displaying search results;

DESCRIPTION OF THE PREFERRED EMBODIMENTS

Figure 1:
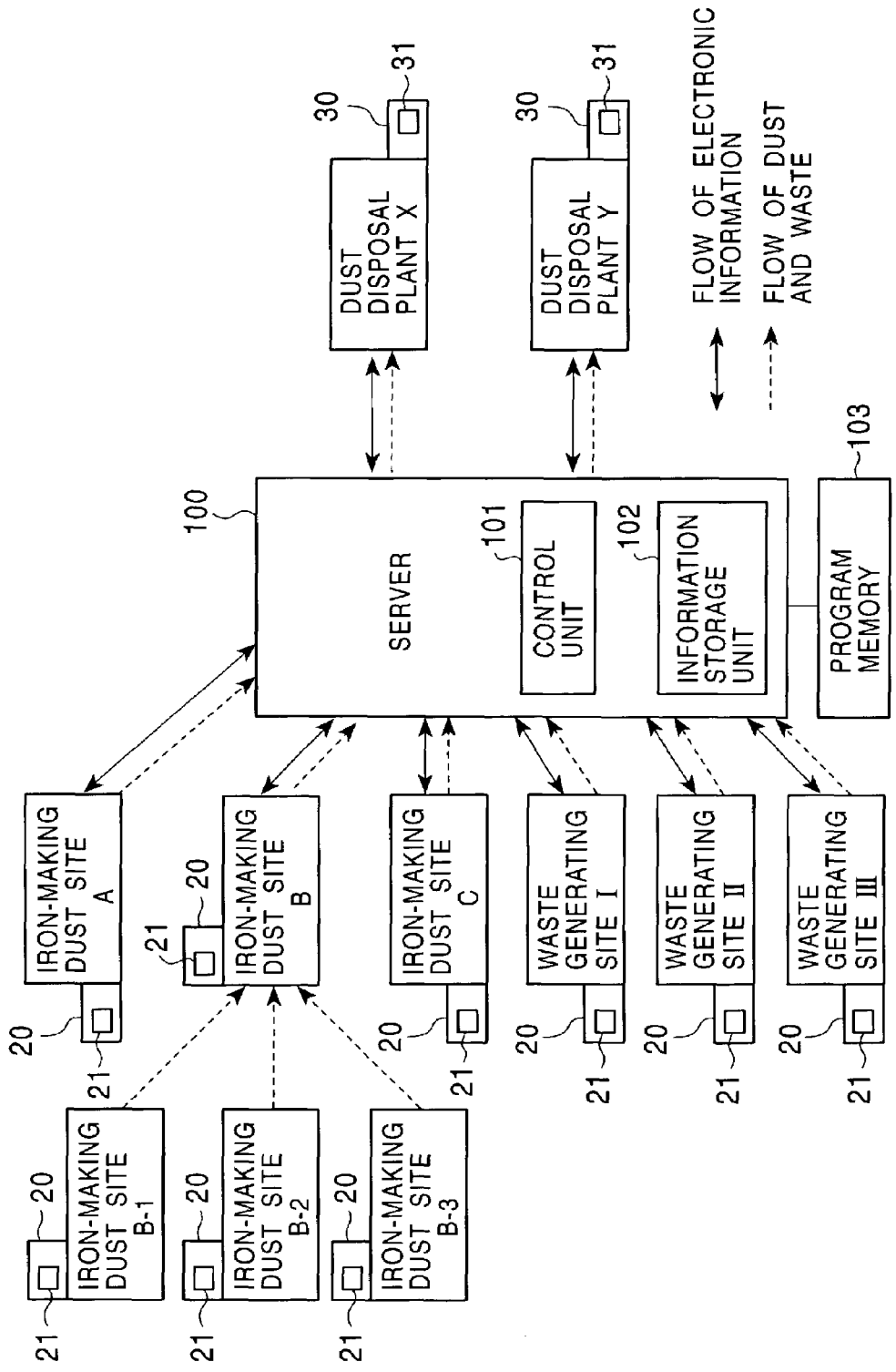
FIG. 1 is a block diagram of an embodiment of a system for providing information on industrial wastes according to the present invention.

FIG. 1 is a block diagram of the overall configuration of an embodiment of a system for providing information on industrial wastes in accordance with the present invention. A server 100 lies in a communication network and typically in the Internet, and includes a control unit 101, an information storage unit 102 for storing various types of information, and a program memory 103 for storing various control programs that are necessary for operation of this system.

Iron-making dust sites A, B, and C located at different places generate iron-containing wastes and have terminals 20 that can access the server 100 through the Internet. Each terminal 20 includes a control unit 21 and an operation unit for inputting information on industrial wastes. The iron-making dust site B includes affiliate iron-making dust sites B-1, B-2, and B-3. Waste generating sites I, II, and III are generic terms for steel plants and other waste generating sites, and have terminals 20 and control units 21. In this embodiment, the iron-making dust site B administrates the affiliate iron-making dust sites B-1, B-2, and B-3 and controls the information on industrial wastes thereof. Alternatively, the iron-making dust sites B-1, B-2, and B-3 may control the information by themselves. The detail will be described below with reference to FIG. 2.

Iron-making dust treatment sites (plants) X and Y located at different places dispose industrial wastes and have terminals 30 that can access the server 100 through the Internet. This system must have at least one iron-making dust treatment plant. Each terminal 30 includes a control unit 31 and an operation unit for inputting conditions on industrial wastes required by the iron-making dust treatment plant. The terminals 20 can communicate with the terminals 30 through the server 100.

The iron-making dust treatment plants X and Y will now be described. Furnaces for disposing industrial wastes are disposed at predetermined places in the iron-making dust treatment plants. An example of such furnaces is a rotary hearth furnace shown in FIGS. 12 to 15.

Figure 12:
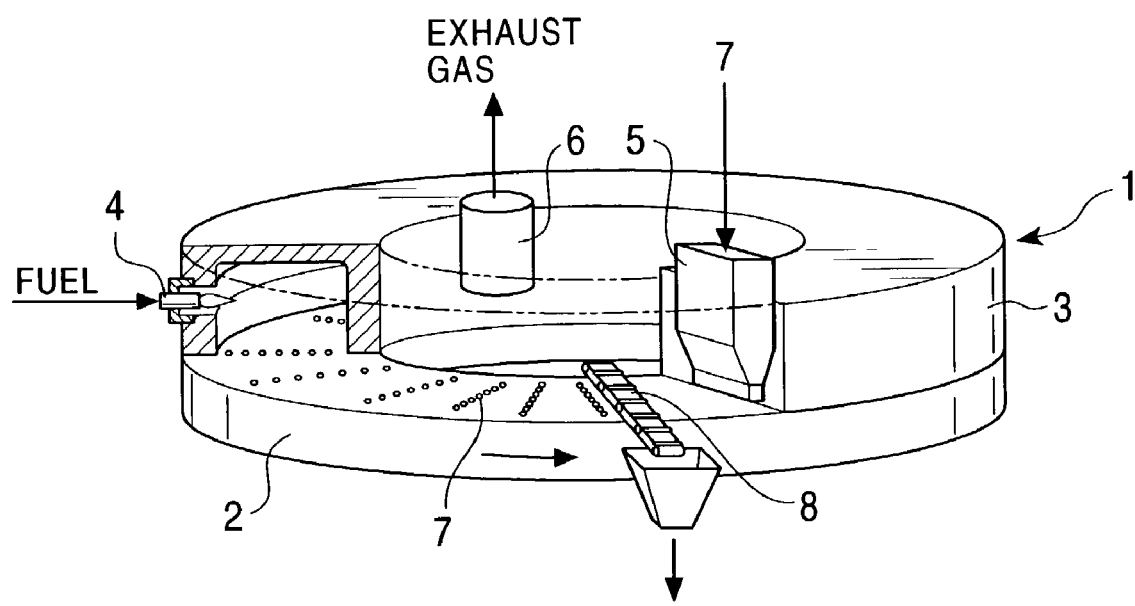
FIG. 12 is an outline isometric view of a rotary hearth furnace that is an embodiment of a heat treatment furnace in the present invention.
Figure 13:
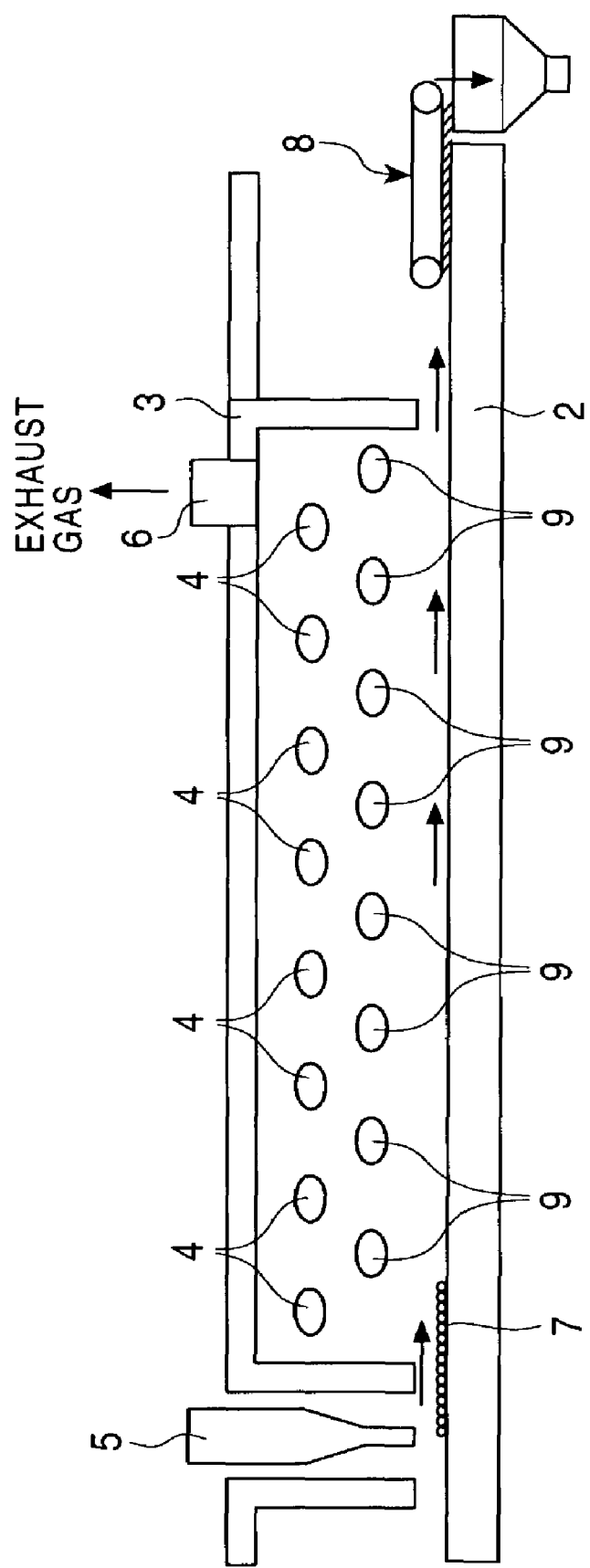
FIG. 13 is a schematic cross-sectional view along the moving direction of a hearth of the rotary hearth furnace shown in FIG. 12.

FIG. 12 is a partially broken isometric view of the rotary hearth furnace 1, and FIG. 13 is a schematic cross-sectional view along the moving direction of a hearth 2 of the rotary hearth furnace 1 shown in FIG. 12. The rotary hearth furnace 1 includes a circular rotary hearth 2 and a furnace casing 3 surrounding the rotary hearth 2. The rotary hearth 2 rotates on its axis at a predetermined rate. The furnace casing 3 is provided with a plurality of burners 4 that control the temperature in the furnace. In FIG. 13, eight burners 4 are provided; however, the number of the burners 4 is not limited and can be changed according to the size of the rotary hearth furnace 1.

Industrial waste 7 is fed into the furnace through a feed port 5, and is reduced by combustion heat from the burners 4 and radiant heat on the rotary hearth furnace 1. Exhaust gas is discharged from a vent 6, while reduced metal and unburned residue are removed by a discharger 8 to the exterior. In this embodiment, the amount of the industrial waste 7 fed into the rotary hearth furnace 1, the furnace temperature, the moving (rotation) rate of the hearth are adjusted to change the metallization rate of the discharged material, the removal rate of volatile components such as zinc, and the treatment rate of the waste. The rotary hearth 2 is heated during this process, and industrial waste 7 is continuously fed onto the heated rotary hearth 2. Thus, the heat of the rotary hearth 2 is effectively used.

There are various types of industrial waste; metal oxide-containing dust generated in steel plants, garbage and refuse derived fuel (RDF) that are carbonaceous materials used for reducing metal oxides, waste materials such as waste plastic and shredder dust, pulverized coal, and coke breeze. Preferably, garbage, RDF, and waste materials are dry-distilled before use to increase the degree of coalification. Preferably, the waste mixture is integrated into briquettes so that the radiant heat in the furnace rapidly transfers into the waste. Carbonaceous materials, which function as reducing agents for metal oxides and fuel, may be fed with iron-making dust or may be fed into different places in the furnace in each reduction stage, for example, a preliminary reduction stage, an initial reduction stage, and a final reduction stage.

In this embodiment, the amount of the industrial waste 7 fed on the rotary hearth 2 is preferably control by the thickness of the industrial waste 7. For example, the distance between the feed port 5 and the rotary hearth 2 is adjusted. Alternatively, a rotary leveler (not shown) may be provided.

Gas feed ports 9 provided in the vicinity of the rotary hearth 2 feed oxygen-containing gas that promotes secondary combustion of combustible gas generated reduction or pyrolysis of the industrial waste 7. If fuel is insufficiently fed from the industrial waste 7, fuel for the burners 4 is increased to control the temperature in the furnace. Examples of fuels for the burners 4 include gaseous fuels such as natural gas and liquid petroleum gas (LPG), liquid fuels such as heavy oil, and solid fuels such as pulverized coal. It is preferable that waste materials such as waste oil and waste plastic be used in view of effective use of waste materials.

The number of the burners 4 and the number of the gas feed ports 9 are not limited and can be determined in view of the size and ability of the rotary hearth furnace. In some cases, the use of the burner 4 can be suspended after the industrial waste 7 fed into the furnace is heated to a desired temperature by the burners 4. In such a case, the feed rate of the oxygen-containing gas for secondary combustion is adjusted to control the temperature in the furnace.

Figure 14:
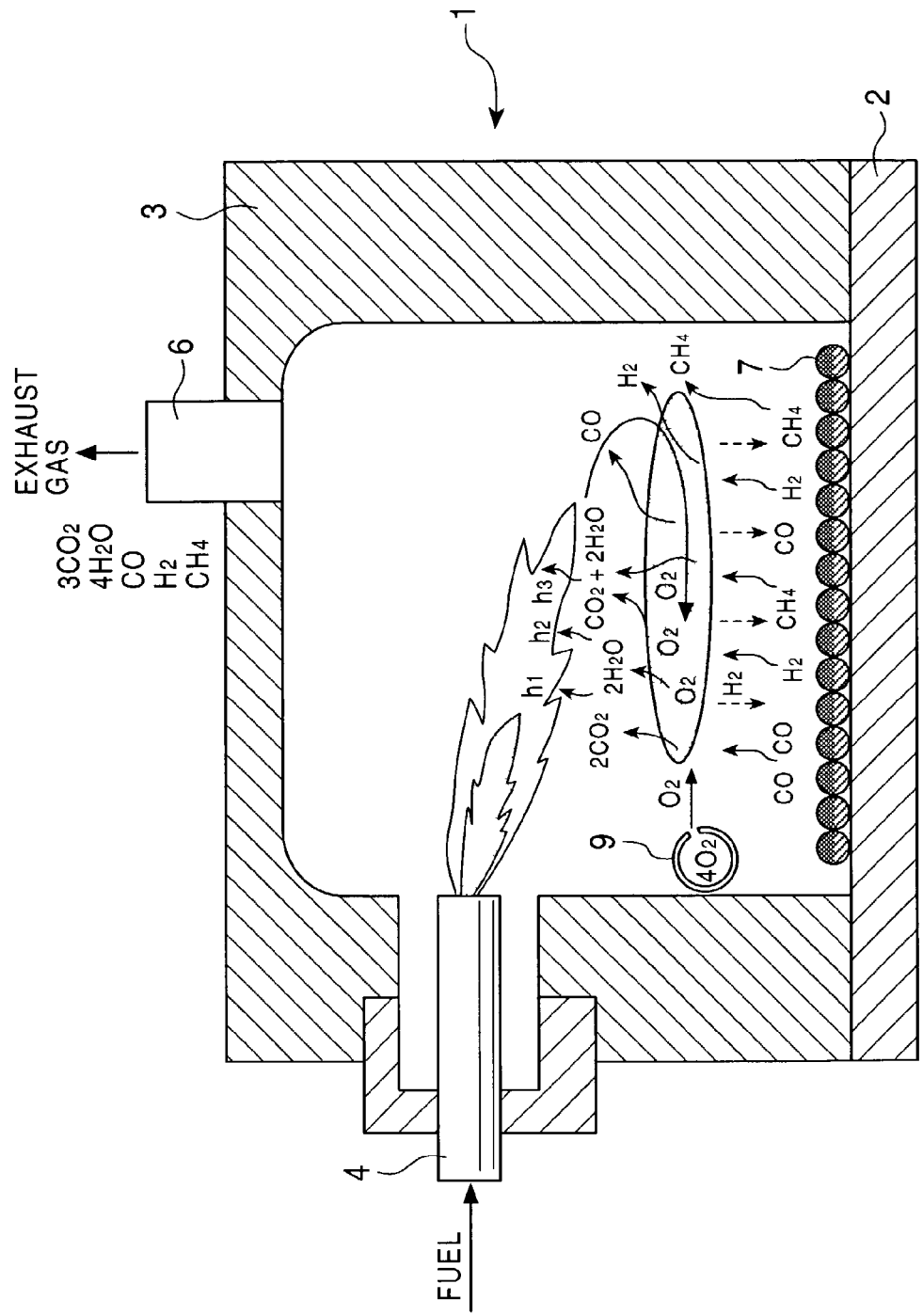
FIG. 14 is a longitudinal cross-sectional view of the rotary hearth furnace 1 shown in FIG. 12.

FIG. 14 is a longitudinal cross-sectional view of the rotary hearth furnace 1 shown in FIG. 12. Organic materials such as hydrocarbons contained in the industrial waste 7 are pyrolyzed by the heat from the burners 4 and the radiant heat into gas in the rotary hearth furnace 1, as described above. Combustible gases (CO, $H_2$, and $CH_4$ in FIG. 14) are burned by oxygen in the furnace.

Metal oxide contained in the industrial waste 7 is reduced by the carbonaceous materials to form metal and CO gas. For example, the reaction for iron oxide is as follows: $FeO+C \rightarrow Fe+CO$. This reductive reaction is endothermic and requires heat. Thus, the combustible gases formed by the pyrolytic reduction, such as CO, $H_2$, and $CH_4$, are burned by air introduced into the furnace to generate combustion heat ($h_1$, $h_2$, and $h_3$ in FIG. 14) to facilitate heating and reaction of the industrial waste 7.

If the gas feed ports 9 cannot be provided in the furnace, the burners 4 are preferably of combustible type that can burn fuel in the presence of excess air. Combustible gases formed by pyrolysis of the industrial waste can thereby be burned by oxygen contained in the excess air. The number and positions of such burners are not limited. When the furnace is divided into several zones with partition plates extending from the ceil, preferably, at least one burner is disposed in each zone to control the temperature of the zone by adjusting the combustion of the burner.

Any type of industrial waste may be disposed in the rotary hearth furnace. Examples of industrial wastes include iron-making dust, waste plastic, shredder dust, recycled waste paper, and RDF, which are generated as city refuse and industrial wastes. Examples of industrial wastes generating volatile hazardous components include wastes containing alkali metals, lead, and zinc; chlorine-containing materials, such as vinyl chloride resins and vinylidene chloride resins; and sulfur-containing materials, such as vulcanized rubber.

The shape of the industrial waste is not limited in the present invention. Preferably, the industrial waste is pulverized into a uniform size and then the pulverized waste is integrated into agglomerates having a proper size, in order to facilitate feeding of the industrial waste into the furnace and to enhance treatment efficiency. The size of the agglomerates is preferably in the range of 6 to 50 mm in diameter. For example, the agglomerates may be, but not limited to, granules, briquettes, pellets, and rods. Integration may be performed with any known machines, for example, briquette forming presses such as cylinder presses, roll presses, and ring roller presses; extruders; and tumbling granulator such as pan pelletizers and drum pelletizers.

The rotary hearth furnace 1 can produce reduced metal by reduction of the metal oxide contained in the industrial waste. The temperature in the combustion region may be increased to a temperature above the melting point of the ash component to separate reduced metal from the ash component.

Alternatively, a mixture of a material containing metal oxide such as iron oxide and industrial waste containing carbonaceous materials may be pelletized. In the case of industrial waste containing a known amount of reducing agent, the composition of the mixture can be easily determined and a desired metal can be readily recovered by reduction. The pelletized mixture of the industrial waste and the metal oxide such as iron oxide and iron-making dust is fed into the furnace to form reduced metal by solid-phase reduction in the furnace. Furthermore, reduced metal and byproduct slag are melted in the furnace to form granular metal iron by cohesion due to affinity thereof. Thus, the industrial waste can be effectively disposed in the furnace, and metallic residue and slag residue can be easily reduced, melted, and separated.

The type and content of the metal oxide are not limited. When the metal oxide is iron oxide, preferably, the iron oxide content is at least 5 percent by mass and more preferably at least 10 percent by mass of the agglomerate fed into the furnace. For reduction of iron oxide, the iron oxide content is preferably in the range of 50 to 85 percent by mass.

The present invention will now be described in further detail by EXAMPLES 1 and 2.

EXAMPLE 1

A mixture of industrial waste and steel plant dust (metal oxide) shown in Table 1 was integrated into agglomerates. The agglomerates were disposed in a rotary hearth furnace having a diameter of 8.5 mm.

TABLE 1

| Material | Fed amount (t/h) | Chemical component | | |
|---|---|---|---|---|
| | | Total Fe | C | Zn |
| Blast furnace sluge | 1.0 | 32 | 37 | 1.2 |
| Electric furnace dust | 1.0 | 31 | 0.2 | 21.0 |
| Mill scale | 1.0 | 69 | 0 | 0 |
| Charcoal | 0.5 | 0 | 68 | 0 |

Figure 15:
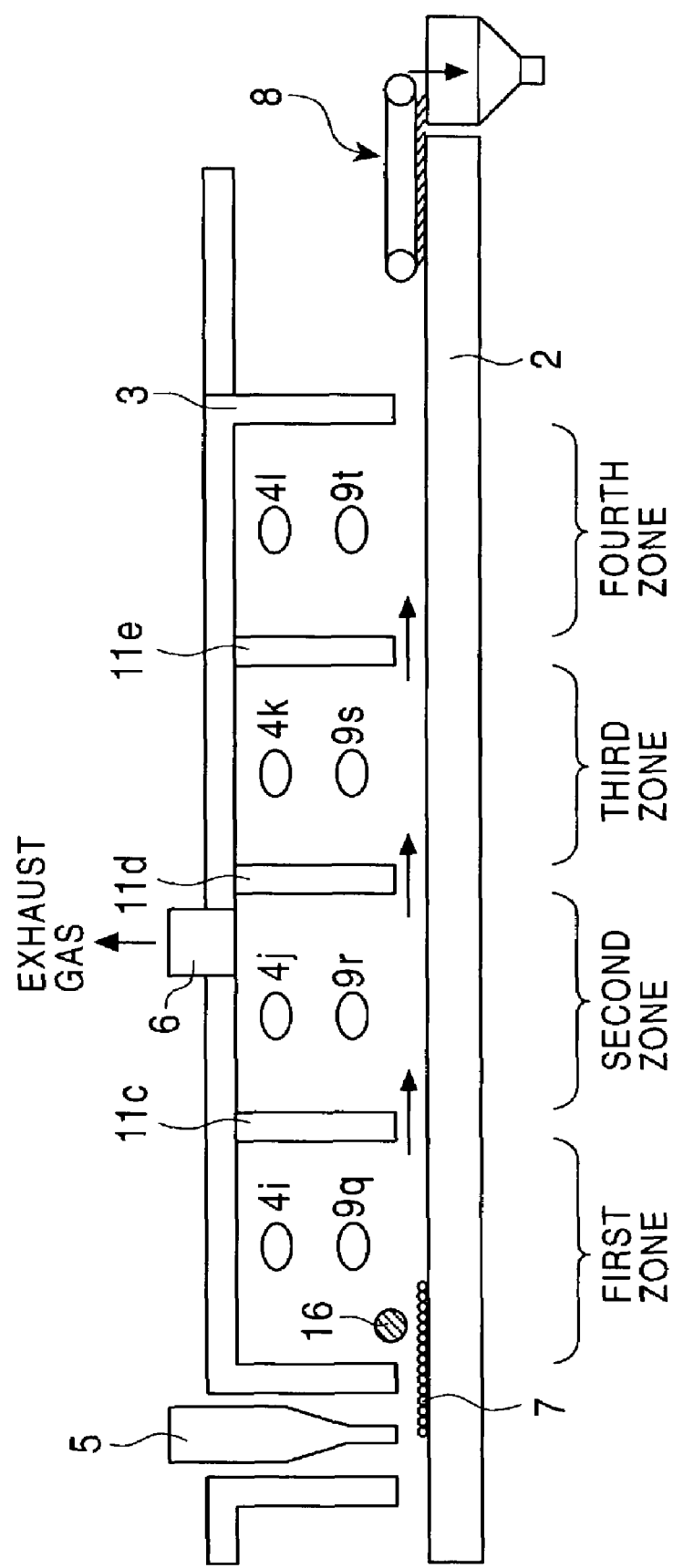
FIG. 15 is a schematic cross-sectional view along the moving direction of a hearth of a rotary hearth furnace used in an experiment.

FIG. 15 is a schematic cross-sectional view along the moving direction of a hearth of the rotary hearth furnace used in the experiment. The rotary hearth furnace includes a rotary hearth 2, a furnace casing 3, burners 4i to 4l, a feed port 5, a vent 6 for exhaust gas, industrial waste 7, a discharger 8, gas feed ports 9q to 9t for supplying oxygen-containing gas for secondary combustion, a controller 10 for controlling the feeding rate of the oxygen containing gas, partition plates 11c to 11e, and a rotary leveler 16. The partition plates 11c to 11e divide the furnace into four zones (first to fourth zones) provided with the burners 4i to 4l. The first and second zones are maintained at 1,200° C. and the third and fourth zones are maintained at 1,300° C. by the burners.

Table 2 shows the weight of a product reduced in the furnace and the weight of volatile secondary dust collected by a bag filter. The product contains a large amount of metallized iron and the secondary dust contains a large amount of zinc.

TABLE 2

| | Yield (t/h) | Total Fe | Metallic Fe | Zn |
|---|---|---|---|---|
| Reduced product | 1.7 | 68% | 58% (metallization rate 85%) | 0.3% |
| Secondary dust | 0.18 | 0.3% | 0% | 63% |

EXAMPLE 2

The waste mixture was disposed as in EXAMPLE 1, except that 300 kg/h of waste plastic was further fed into the rotary hearth furnace and natural gas was used as fuel for the furnace. As shown in Table 3, the natural gas consumed in the furnace is reduced from 21.4 GJ/h when no waste plastic is fed to 16.4 GJ/h. The use of the waste plastic contributes to reduction in fuel gas cost.

TABLE 3

| | COMPARATIVE EXAMPLE | EXAMPLE 2 | Reduction in fuel gas |
|---|---|---|---|
| Waste plastic used (kg/h) | 0 | 300 | — |
| Fuel gas used (GJ/h) | 21.4 | 16.4 | δ 5.0 |

The temperature at a downstream position of the combustion region was 1,500° C., which was higher than the melting point of an ash component in the residue, and High-purity metal iron and the ash component were separately discharged.

Figure 2:
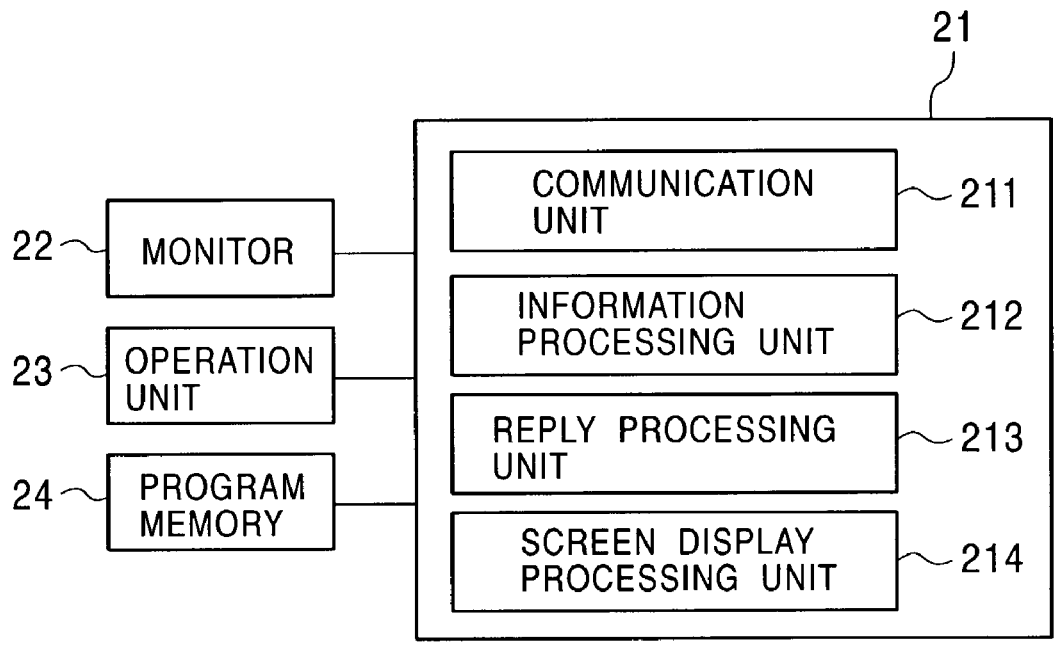
FIG. 2 is a block diagram showing a process in a terminal including software at an iron-making dust generating site.
Figure 3:
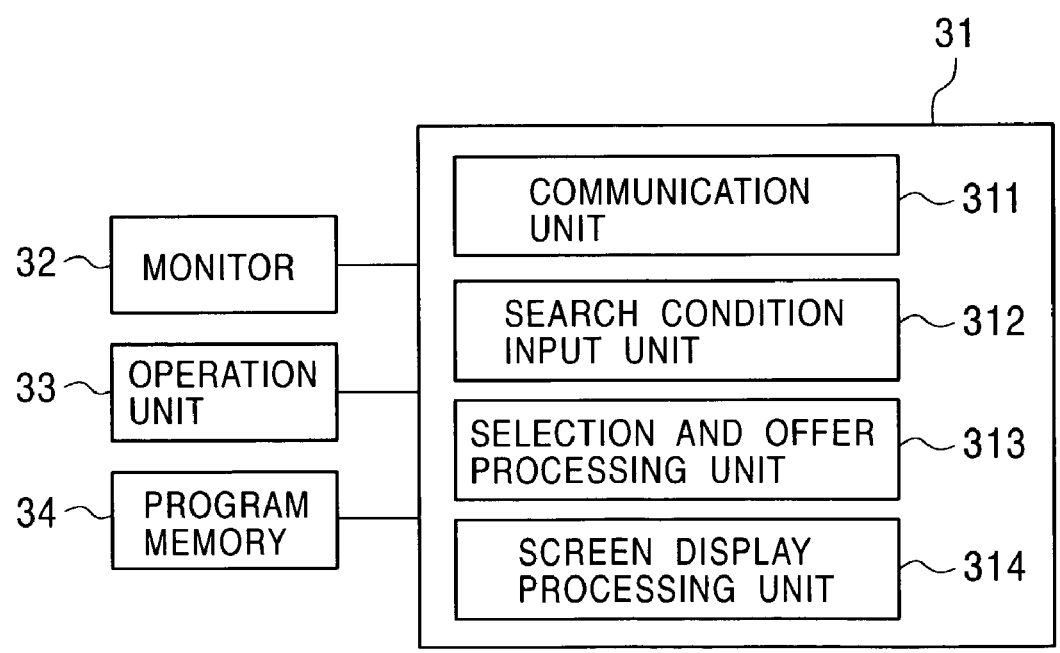
FIG. 3 is a block diagram showing a process in a terminal including software at an iron-making dust disposer.
Figure 4:
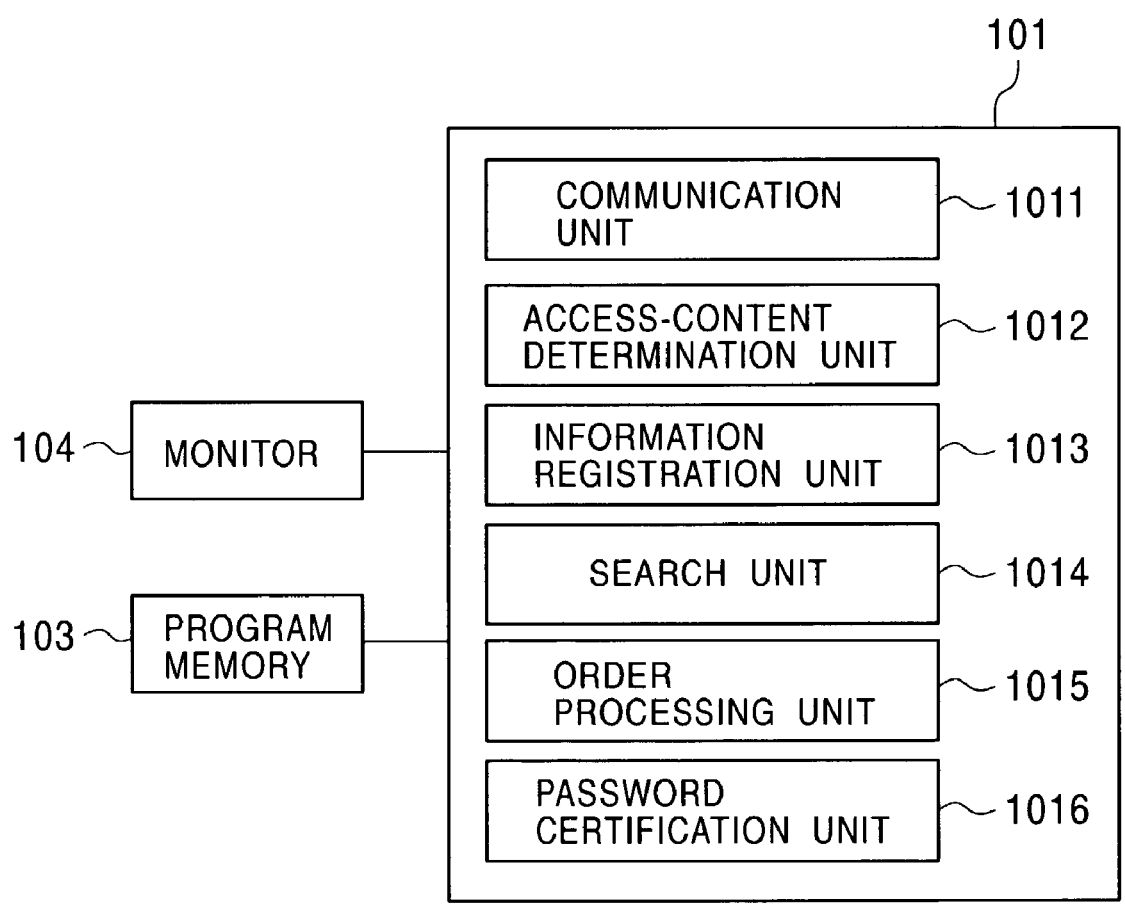
FIG. 4 is a block diagram showing a process in a control unit including software of a server.

A system for providing information on industrial wastes will now be described in detail with reference to FIGS. 2 to 11. FIG. 2 shows a configuration of the control unit 21 including software of the terminal 20 shown in FIG. 1; FIG. 3 shows a configuration of the control unit 31 including software of the terminal 30 shown in FIG. 1; and FIG. 4 shows a configuration of the control unit 101 including software of the control unit 101 of the server 100 shown in FIG. 1.

Referring to FIG. 2, the control unit 21 is connected with a monitor 22 for displaying images, an operation unit 23 including a numerical keypad and other keypads, and a program memory 24 for storing control programs. The program memory 24 may be built-in ROM or an external memory, i.e., a floppy disk, CD-ROM, or a DVD. A control program is read from the program memory 24 and is executed so that processing units of the control unit 21 work.

The control unit 21 includes a communication unit 211 that sends/receives various types of information with e-mail address for the terminal 20 to/from the server 100; an information processing unit 212 that accepts the key operation input from the operation unit 23 and converts the information to text information corresponding to a key operation or directional information; a reply processing unit 213 that replies whether the offer is acceptable or not to an electronic offer from the server 100; and a screen display processing unit 214 that converts the input information into a predetermined format (shown in FIG. 5) and transmits the format to the monitor 22. These units 211 to 214 are generally composed of software.

FIG. 5 shows an exemplary input screen of the information on industrial wastes displayed on the monitor 22. An identification code of an iron-making dust site generating iron-making dust appears at the upper left of the screen, and is followed by a list describing details of he industrial wastes. The columns of the list indicate the industrial wastes and the rows indicate information on the industrial wastes. For example, the first column includes dust "A-1" (real name is displayed in the actual case), the second column dust "A-2" and the third column dust "A-3" on row "NAME" (dust name). Below the "NAME", "TYPE" of dust, "QUANTITY" in ton of dust, "DELIVERABLE DATE" (month and day) of dust, "WATER CONTENT" (%) of dust, "IRON" content (%), "CARBON" content (%), and "ZINC" content (%) in "COMPOSITION" of dust, and "α COMPONENT" appears. The "QUANTITY" represents the deposited quantity of the dust. "AVERAGE QUANTITY" may be included on the row. The estimated quantities of industrial wastes per day or per week facilitate transaction for industrial waste treatment sites.

The format shown in FIG. 5 is also used for input from the terminals 20 of the ion-making dust sites I, II, and III. The format may be modified in response to the input of properties of the wastes and other items, if necessary. In the format shown in FIG. 5, three columns are displayed. Other columns can also be displayed by horizontal scroll of the screen (the scroll box is not depicted in the drawing).

Referring to FIG. 3, the control unit 31 is connected with a monitor 32 for displaying images, an operation unit 33 including a numerical keypad and other keypads, and a program memory 34 for storing control programs. The program memory 34 may be built-in ROM or an external memory, i.e., a floppy disk, CD-ROM, or a DVD. A control program is read from the program memory 34 and is executed so that processing units of the control unit 31 work. The control programs may be downloaded from the server 100 to the program memory 34 and the program memory 24 (FIG. 2) through a communication line, if necessary.

The control unit 31 includes a communication unit 311 that sends/receives various types of information with e-mail address for the terminal 30 to/from the server 100; a search condition input unit 312 that accept the key operation input from the operation unit 33 and converts the information to text information corresponding to a key operation or directional information; a selection and offer processing unit 313 that selects the search result information received from the server 100 and prepares an electronic offer (order) based on the search results; and a screen display processing unit 314 that converts the input information into a predetermined format (shown in FIG. 6) and transmits the format to the monitor 32. The units 311 to 314 are generally composed of software.

FIG. 6 shows an exemplary search condition input screen displayed on the monitor 32. An iron-making dust disposer is displayed at the upper left of the screen. In the subsequent rows, various conditions, such as properties of the wastes (industrial wastes and scraps) that are required by the dust disposer. The disposer can readily input various conditions into these boxes arranged in several rows. For example, "X-a" is automatically displayed in the input box "PROPOSED DUST ID NO." in the first row. For this ID No., four conditions can be input in the order of descending priorities. In the drawing, the first priority boxes are filled with "QUALITY" and "IRON<50%". The second priority boxes are filled with "DISPOSABLE QUANTITY" and "10,000" (t). The third priority boxes are filled with "COLLECTED DATE" of dust and "Month and Date". The fourth priority boxes are filled with "WATER CONTENT" and "<10" (%). Furthermore, any other required item can be input in "OTHER REQUIRED ITEMS". Such input boxes facilitates search of various types of waste.

In the second input region, "X-b" is automatically displayed in the box "NECESSARY WASTE ID NO.". "TYPE" of waste, "REQUIRED QUANTITY", "DESIRED CONDITION", and "ARRIVAL DATE" can be input in this region. In the third input region, "X-c" is automatically displayed in the box "NECESSARY WASTE ID NO.". Also, "TYPE" of waste, "REQUIRED QUANTITY", "DESIRED CONDITION", and "ARRIVAL DATE" can be input in this region. Examples of the input in the box "REQUIRED QUANTITY" are "CALORIFIC VALUE" and "DUST SIZE". Other rows can also be displayed by vertical scroll of the screen (the scroll box is not depicted in the drawing). Accordingly, the disposer can simultaneously search a plurality of required wastes including reducing agents in this format.

Referring to FIG. 4, the control unit 101 is connected with a monitor 104 and a program memory 103 for storing control programs and search programs. The program memory 103 may be built-in ROM or an external memory, i.e., a floppy disk, CD-ROM, or a DVD. A control program is read from the program memory 103 and is executed so that processing units of the control unit 101 work. The control programs may be downloaded from a communication terminal of the server administrator. This system is also applicable to download of control programs and various types of data to the terminals 20 and 30 shown in FIG. 1.

The control unit 011 includes a communication unit 1011 that sends/receives various types of information to/from terminals 20 and 30; an access-content determination unit 1012 for identifying the job based on the terminal ID connected; an information registration unit that stores the information of industrial wastes shown in FIG. 5 and the terminal ID information into the information storage unit 102 if the access content is a request of registration of the information on industrial wastes from the terminal 20; a search unit 1014 that searches the information stored in the information storage unit 102 for information satisfying the search conditions and outputs the search results in the format shown in FIG. 7 if the access content is a request for search from the terminal 30; an order processing unit that transmits an electronic order of the dust upon the request for an order from the terminal 30 to the terminal 20 of an iron-making dust site having the searched dust; and a password certification unit 1016. These units 1011 to 1016 are generally composed of software.

The information storage unit 102 has a member memory segment that stores registered member names, passwords, and electronic mail addresses and an industrial waste information-storing segment that stores combinations of "dust names" and "industrial waste-generating sites" in connection with the electronic order from the terminal 30. This system employs a membership system and issues a password when a new member is registered. Since the password can discriminate whether the accessing person is a member or not and whether the person is an iron-dust generating site or an iron-dust disposer, this system can inhibit exchange of information between iron-dust generating sites and between iron-dust disposers. In other words, any iron-dust generating site or any iron-dust disposer cannot browse other persons' information in the same line.

FIG. 7 shows an exemplary search result of the information on industrial wastes displayed on the monitor 32. In this display, the priority order is "IRON CONTENT" (chemical component), "WEIGHT", AND "LOCATION" of the waste. In the "LOCATION" box, the iron-dust generating site and its address are displayed.

A "CHECK" button is clicked, the detailed information is displayed. In this case, the search unit 1014 receives the detailed information shown in FIG. 5 from the information storage unit 102 and the communication unit 1011 transmits it to the monitor 32 of the terminal 30 shown in FIG. 1. The detailed information includes an order button (although not shown in the drawing). When the order button is clicked, the order is transmitted to the terminal 20 (FIG. 1) of the iron-making dust site having the corresponding dust by the selection and order-processing unit 313 (FIG. 3) and the order-processing unit 1015 of the server 100.

Figure 8:
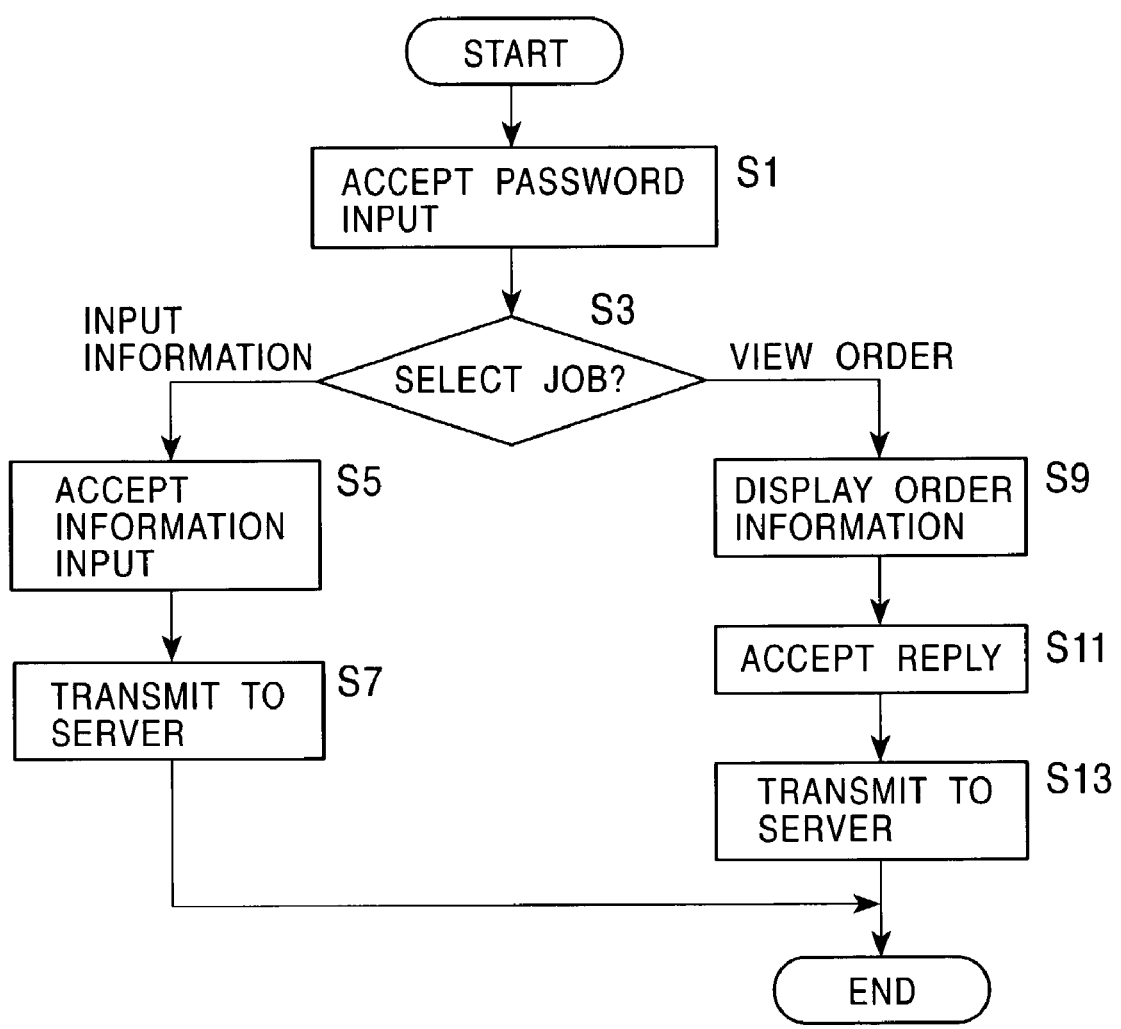
FIG. 8 is a flow chart of a process of a control unit of a terminal at an industrial waste-generating site.

FIG. 8 is a flow chart of a procedure of a control unit 21 of a terminal 20 shown in FIG. 2 at an industrial waste-generating site. In this system, a password has been issued for each of members including industrial waste-generating sites and industrial waste disposers.

When the terminal 20 accesses the server 100, a message on the monitor 22 prompts the input of a password from the operation unit 23 of the terminal 20 (Step S1). After the input password is certified, the job is selected in Step S3. If the input of the information on industrial wastes is selected, Step S5 is performed. If the view of the order is selected, Step S9 is performed. In Step S5, the monitor 22 displays the format shown in FIG. 5 and accepts the input of required items. Upon clicking a confirmation button (not shown in the drawing) after the input of the required items on the corresponding "DUST NAME", the communication unit 211 transmits the input information to the server 100 for registration (Step S7).

In Step S9, the monitor 22 displays an electronic order from the server 100 upon the order from the terminal 30 and prompts a reply whether the order is acceptable or not. When the reply is accepted from the operation unit 23 (Step S11), the reply is transmitted to the server 100 from the communication unit 211 (Step S13).

Figure 9:
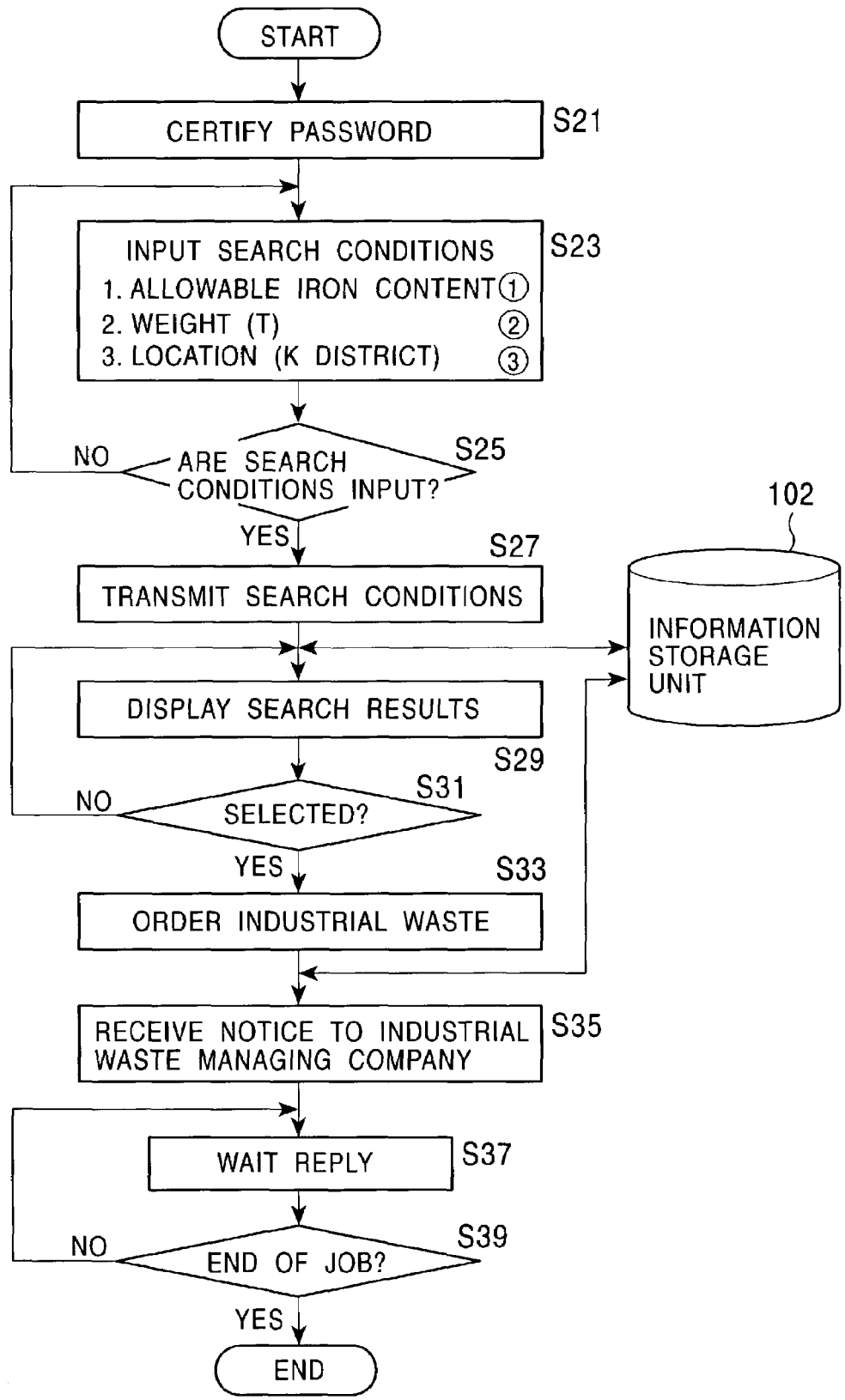
FIG. 9 is a flow chart of a process of a control unit of a terminal as an industrial waste disposer.

FIG. 9 is a flow chart showing a procedure of the control unit 31 shown in FIG. 3 of a terminal 30 (FIG. 1) of an industrial waste disposer. When the terminal 30 accesses the server 100, a message on the monitor 32 prompts the input of a password from the operation unit 33 of the terminal 30 (Step S21). After the input password is certified, the monitor 32 displays the input format for search conditions as shown in FIG. 6 and prompts the input of required items (Step S23). When a confirmation button (not shown) is clicked (Step S25), the communication unit 311 transmits the search condition information to the server 100.

The search results shown in FIG. 7 are transmitted from the server 100 and are displayed on the monitor 32 (Step S29). Then, selection of viewing of detailed information is required (Step S31). When the viewing of detailed information is selected, a format prompting the order of the industrial waste is displayed (Step S33). The order from the operation unit 33 is transmitted to the server 100 through the communication unit 311.

In Step S35, the server 100 transmits the order the terminal 20 at the industrial waste-generating site and the notice of the order to the monitor 32. The screen of the monitor 32 waits the reply from the terminal 20 (Step S37). If a prompt reply is not available, the job is completed and the terminal 20 is disconnected from the server 100 upon the input of the job end command. If any reply is transmitted from the terminal 20 after the disconnection, the monitor 32 displays a sign indicating the reply and the reply is stored in an individual information storing region and can be viewed through the terminal 30 at any time.

Figure 10:
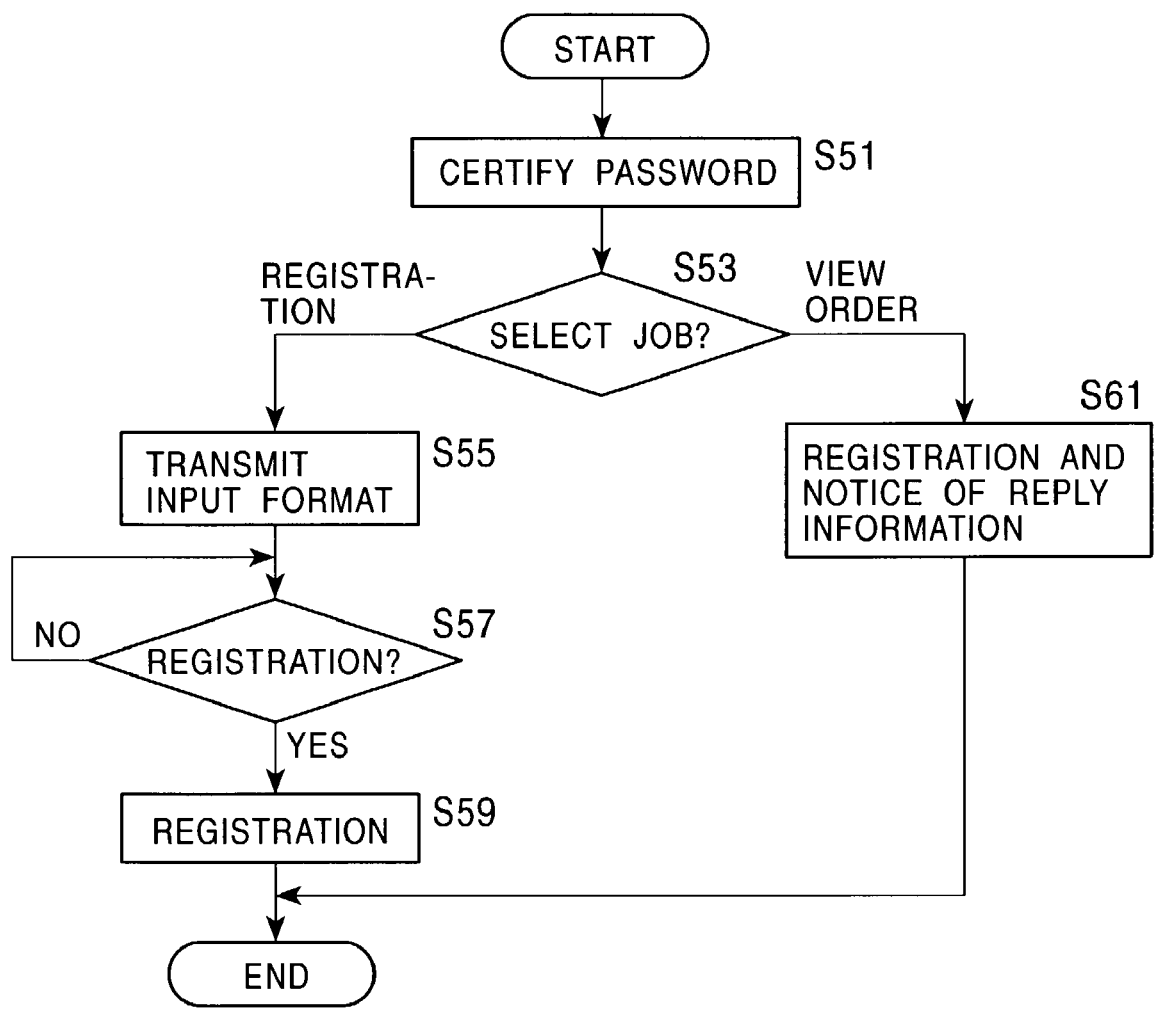
FIG. 10 is a flow chart of a process at a server when a terminal at an industrial waste-generating site accesses the server.

FIG. 10 is a flow chart showing a procedure at the server 100 when the terminal 20 accesses the server 100. The input password is certified with reference to the registered passwords stored in the member information region of the information storage unit 102 (Step S51). In Step S53, the job is selected. If the job is a request for registration (input) of information on industrial wastes, the step skips to Step S55. If the job is a request for viewing the order, the step skips to Step 61.

In Step S55, the format that is shown in FIG. 5 and prompts the input of the information on industrial wastes is transmitted to the corresponding terminal 20. The server 100 waits the input of the corresponding information (Step S57) and stores the input information into the industrial waste information-storing region (Step S59). For a reply for the order, the received request is stored in the storage region for the corresponding iron-making dust disposer and is transmitted to the corresponding terminal 30 (Step S61). If the line is connected, the replay may be directly transmitted to the terminal 30. The terminal 20 may have the format for inputting the information on industrial wastes shown in FIG. 5.

Figure 11:
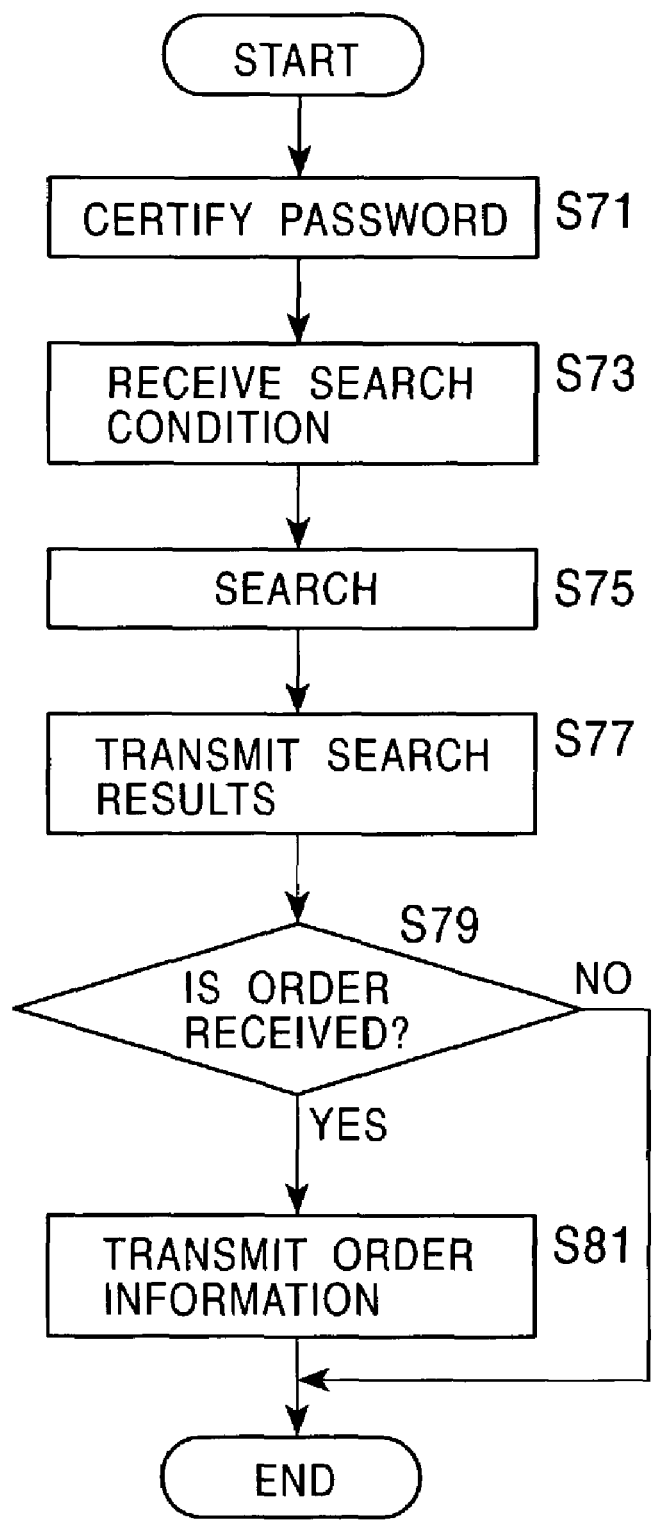
FIG. 11 is a flow chart of a process at a server when a terminal at an industrial waste disposer accesses the server.

FIG. 11 is a flow chart showing a procedure at the server 100 when the terminal 30 accesses the server 100. The input password is certified with reference to the registered passwords stored in the member information region of the information storage unit 102 (Step S71). After the certification of the password, the search conditions are received (Step S73). The search program performs search of the information on industrial wastes stored in the information storage unit 102 based on the search conditions (Step S75). The search results in the form shown in FIG. 7 are transmitted to the terminal 30 of the corresponding industrial waste disposer (Step S77). The results may include any additional information. The server 100 waits the input of the order from the terminal 30 (Step S79). Upon receiving the order, the server 100 transmits the electronic order to the terminal 20 at the corresponding iron-dust generating site (Step S81).

In the search of the industrial wastes, the priority may be input, if necessary. If the priority is not input, industrial wastes that satisfy all the input items are extracted. If any priority is input, the following information is extracted; industrial wastes satisfying only the first priority, industrial wastes satisfying both the first and second priorities, industrial wastes satisfying all the first to third priorities, in addition to the industrial wastes satisfying all the input items. Any other priority systems may be employed in the present invention.

The present invention also includes the following modifications:

(1) Instead of the format for inputting the search conditions shown in FIG. 6, any iron-making dust disposer stores information on wastes he needs into the server so that any iron-making dust generating site can view the information at any time. This system facilitates transactions between them and reduces the required memory of the server.

(2) The present invention is also applicable to an open membership system, although a membership system including password certification is described above.

(3) Any other treatment plants are usable in the present invention. Examples of such treatment plants are rotary hearth furnace, a kiln, a shaft kiln, and a reductive fusion plant. The treatment plant may be of a stationary type or movable type. In the movable type, wireless information communication may be employed.

(4) In the above embodiments, the iron-making dust generating sites are primarily described. However, in the present invention, the industrial waste-generating sites may be other industrial waste-generating sites, such as automobile wastes.

(5) In the present invention, the compositions of the industrial wastes are known because these wastes are obtained in accordance with the search conditions. Dusts from different places are compounded in a proper ratio based on the searched conditions so that reducing agents and reduced materials are present in an optimized ratio. Thus, industrial wastes can be recycled at low cost by reducing the use of natural raw materials such as mineral ore and coal. When the reducing agent falls short of a required amount in industrial wastes from one site, industrial wastes containing large amounts of reducing agents can be obtained from other site in this system. In such a case, crude zinc oxide, in addition to reduced metal, may be obtained in the reduction. All or part of the reaction products of dry distillation can be used as a reducing agent. Alternatively, all or part of gas generated during the dry distillation can be used as fuel gas. Since dusts from different generating sites are mixed, a large amount of dust can be disposed and the treatment plant can enjoy economics of scale. If the reducing agent excess the required amount in industrial wastes from one site, industrial wastes containing small amounts of reducing agents can be obtained from other site in this system.

(6) The present invention is also applicable to industrial wastes not containing metal oxides.

What is claimed is:

1. A method for providing assistance in the delivery of industrial wastes from a plurality of industrial waste-generating sites to at least one industrial waste treatment site based on exchanged information about industrial wastes containing metal oxide, and located at at least some of the industrial waste-generating sites, the method comprising:

a first step of inputting, through a terminal at the industrial waste treatment site, the terminal comprising a portion of a communication network that connects a server with terminals of the plurality of industrial waste-generating sites, search conditions including at least the chemical components, weight, and delivery time of an industrial waste that is located at at least some of the industrial waste-generating sites and is required for the industrial waste treatment site, from the terminal at the industrial waste treatment site, and transmitting the search conditions to the server;

a second step of searching an information storage unit for the information on industrial wastes that satisfies the input conditions in the first step in the server; and a third step of transmitting the search result to the terminal at the industrial waste treatment site.

2. The method according to claim 1, further comprising:
a fourth step of selecting at least one industrial waste from the search result at the terminal at the industrial waste treatment site in response to the third step and transmitting the selected information from the terminal at the industrial waste treatment site to the server; and a fifth step of transmitting order information from the server to a terminal of an industrial waste-generating site having the industrial waste included in the selected information.

3. The method according to claim 1, wherein the information on industrial waste includes a deliverable date of the industrial waste.

4. The method according to claim 1, wherein both the information on industrial waste and the conditions include the address of the industrial waste-generating site.

5. The method according to claim 1, wherein the search conditions in the first step include the order of priority and the second step performs the search in accordance with the order of priority.

6. A recording medium for recording a computer-readable program that allows a computer in the server to execute the method according to claim 1.

7. A program that allows a computer in the server to execute the method according to claim 1.

8. A system for providing assistance in the delivery of industrial wastes from a plurality of industrial waste-generating sites to at least one industrial waste treatment site based on exchanged information about industrial wastes containing metal oxide and located at at least some of the industrial waste-generating sites, the system comprising:

a server;

terminals at the industrial waste-generating sites connecting to the server through a communication network; and at least one terminal at the industrial waste treatment site connecting to the server through the communication network;

the terminal of each of the industrial waste-generating sites comprising:

transmitting means for transmitting information on industrial waste including at least the chemical components and weight, to the server, the server comprising:

information storage means for storing the information on industrial waste associated with the corresponding terminal at the industrial waste-generating site;

receiving means for receiving search conditions from the terminal of the industrial waste treatment site, the search conditions including at least the chemical component, weight, and delivery time of an industrial waste required for the industrial waste treatment site;

search means for searching the information storage unit for information on industrial waste located at at least some of the industrial waste-generating sites that satisfies the input search conditions; and transmission means for transmitting the search result from the server to the terminal at the industrial waste treatment site, the terminal at the industrial waste treatment site comprising:

input means for inputting search conditions including the chemical components, weight, and the delivery time of an industrial waste required for the industrial waste treatment site;

transmission means for transmitting the input search conditions to the server; and receiving means for receiving the search result from the server and displaying the result on a monitor.

9. A server for providing assistance in the delivery of industrial wastes from a plurality of industrial waste-generating sites to at least one industrial waste treatment site based on exchanged information about industrial wastes containing metal oxide and located at at least some of the industrial waste-generating sites, the server connecting with terminals of the plurality of industrial waste-generating sites and the industrial waste treatment site through a communication network, the server comprising:

storage means for storing information on industrial wastes including the chemical components and weights associated with the respective terminals at the industrial waste-generating sites, the information being input from the terminals;

receiving means for receiving search conditions including the chemical components, weight, and the delivery time from the terminal at the industrial waste treatment site;

search means for searching the information storage unit for the information on an industrial waste located at at least some of the industrial waste-generating sites that satisfies the search conditions; and transmission means for transmitting the search result to the terminal at the industrial waste treatment site.

\* \* \* \* \*